United States Patent Office 3,427,359
Patented Feb. 11, 1969

3,427,359
OXYCHLORINATION OF HYDROCARBONS AND A CATALYST THEREFOR
Charles E. Rectenwald and George E. Keller II, South Charleston, and Jared W. Clark, Charleston, W. Va., assignors to Union Carbide Corporation, a corporation of New York
No Drawing. Filed June 8, 1964, Ser. No. 373,546
U.S. Cl. 260—659    15 Claims
Int. Cl. C07c *17/10;* B01j *11/22, 11/08*

The present invention relates to the oxidative chlorination of hydrocarbons and to a catalyst therefor. In one aspect, the present invention relates to the manufacture of chlorinated hydrocarbons by the reaction of hydrocarbons with hydrogen chloride and oxygen wherein gaseous hydrogen chloride is employed as the source of chlorine. In another aspect, this invention relates to an improved catalyst for the oxidative chlorination of hydrocarbons whereby improved yields of chlorinated hydrocarbons are obtained. In still another aspect, this invention is concerned with the support material for the active catalytic ingredients employed in these oxidative chlorination reactions.

The manufacture of chlorinated hydrocarbons by the so-called oxidative chlorination of hydrocarbons is well known in the art. The process comprises catalytically reacting, in the vapor phase, a mixture of hydrocarbon, hydrogen chloride and oxygen. Gaseous hydrogen chloride is employed as a source of chlorine for the hydrocarbon which is the chlorine acceptor in the reaction, thereby producing chlorinated hydrocarbons as the reaction products.

Several catalysts have heretofore been employed to accelerate the reaction rate and to improve the yields of the desirable products. Metal chlorides have been widely used as the active catalytic ingredients, particularly when supported on silica, alumina, silicon carbide, etc. The support materials which have heretofore been employed have all been characterized, inter alia, by having high surface area, usually of the order of at least about 200 m.$^2$/gm. However, the use of support materials having high surface area have not been particularly advantageous in the oxidative chlorination of hydrocarbons to produce chlorinated hydrocarbons. This has been evidenced by low consumption of HCl, high losses to carbon oxides and consequently low yields of and conversion to chlorinated hydrocarbons. These drawbacks which are partly attributed to the use of high surface area support materials have limited their commercial utility in the oxidative chlorination process.

It has now been unexpectedly discovered that the foregoing and other disadvantages and limitations of the prior art methods can be obviated by the use of support materials having low surface area of the order of about 10 m.$^2$/gm., or less. It has been further discovered that it is particularly advantageous to employ support materials which have both low surface area and high pore volume of the order of about 0.15 to 0.3 ml./gm. The active catalytic ingredients are incorporated into the support in a manner to be hereinafter described and the resulting supported catalyst can be efficaciously employed for the commercial oxidative chlorination of hydrocarbons.

The active catalytic ingredients employed herein for the oxidative chlorination of hydrocarbons are mixtures of chlorides of copper, alkali metals and rare earth metals. The relative ratios and the optimum amounts of these chlorides will vary for different supports and depend, inter alia, on the surface area and the pore volume of the support material. Thus copper chloride concentration can range from about 1 to about 10 grams, the concentration of alkali metal chloride can vary from about 1 to about 10 grams and the concentration of the rare earth metal chlorides varies from about 1 to about 10 grams, all weights being based on 100 grams of the support material.

Although chlorides of alkali metals such as sodium and lithium can be satisfactorily employed, preference is given to potassium chloride. This chloride is particularly advantageous for the reactions described herein.

With regard to the choice of rare earth metals, the mixture known as didymium is particularly effective. This mixture mainly comprises lanthanum and neodymium, together with smaller quantities of praseodymium and samarium. By way of example, the following analysis is given for didymium: $La_2O_3$ 20.3%, $Nd_2O_3$ 14.3%, $Pr_6O_{11}$ 4.2%, $Sm_2O_3$ 2.4%, $CeO_2$ 0.5%, $Gd_2O_3$, 1.5%, $Y_2O_3$ 0.2%, others 0.6%, all percents being by weight. Other mixtures of rare earth metals can be employed in lieu of didymium.

With respect to the support material, alpha alumina having low surface area and high pore volume is particularly preferred. However, other known support materials can also be advantageously employed provided, of course, they have low surface area and high pore volumes within the limits defined herein, and provided further that they possess the requisite mechanical strength and stability. Other forms of alumina such as gamma alumina, or a mixture of alpha alumina with gamma alumina can be advantageously employed, but the particular form alpha alumina has been found to be most effective for most, if not all, of the oxidative chlorination reactions described herein.

Is should be mentioned at this point that inasmuch as the novel catalyst is preferably employed in a fluid-bed system, the support material must possess certain other desirable properties which render them suitable for fluid-bed operation. These properties, which include bulk density, particle size and distribution, will be hereinafter described in further detail.

As previously indicated, the novel catalyst is most effective when the active catalytic constituents, i.e., the metal chlorides, are supported on low surface area support material, preferably alumina, and most preferably alpha alumina, rather than a support material having a high surface area. The unexpected improvements resulting from the use of low surface area support material are best illustrated by the following examples wherein, under otherwise similar conditions, methane and ethane are oxidatively chlorinated in the presence of the novel catalyst, the only difference in the examples being in the surface area of the support material which is employed. The recommended surface area of the support material is in the range of from about 0.2 to about 10 m.$^2$/gm., preferably from about 0.5 to about 3.0 m.$^2$/gm.

Support materials having high pore volume have been found to be more effective than those having low pore volume. Support materials having high pore volume are particularly desirable since they permit the incorporation and retention of larger amounts of the active catalytic ingredients in the support as compared to support materials with low pore volume. The activity of the catalyst is accordingly improved since more of the active catalytic ingredients will be contacted by the vaporous feed materials. Pore volume in the range of from about 0.15 to about 0.3 ml./gm. are recommended for the support materials. If the pore volume is reduced below about 0.15 ml./gm., less of the active catalytic ingredients (chlorides) can be incorporated within the support material. Consequently, more of these chlorides must be coated upon the outside surfaces of the support to maintain the desired catalytic activity. This is detrimental to the operation since, under the prevailing reaction conditions, the coated support particles will tend to agglomerate and give poor fluidization performance. On the other hand, when the pore volume exceeds about 0.3 ml./gm., the mechanical strength and stability of the support materials is adversely affected. This results in excessive losses of the catalyst from the reaction zone due to attrition which renders the catalyst unsuitable for fluid-bed operation.

Since, as aforementioned, the novel catalyst is employed in a fluid-bed system, it is important that the particle size and distribution, as well as the bulk density of the supported material, be so selected as to be readily fluidizable without excessive catalyst loss from the reaction zone. These variables, however, are not narrowly critical in this invention and may be selected by those skilled in the art for each particular system. In general, bulk densities of the support material can range from about 1.0 to about 1.3 gm./ml. and the particle sizes can vary from about 40 to about 250 microns in average diameter. More desirably, from about 50 to about 75 percent of the support materials should have an average particle diameter greater than about 75 microns. Furthermore, particles larger than about 150 microns should not exceed about 10% while those smaller than about 40 microns should be limited to about 5% or less of the total.

The catalyst of this invention is prepared simply by dissolving appropriate amounts of copper chloride, alkali metal chloride, e.g., potassium chloride and rare earth metal chloride, e.g., didymium chloride, in water. The resulting solution is then thoroughly blended by known means with the support material, e.g., alpha alumina. The wetted support is then heated at a temperature of from about 100° C. to about 300° C. for several hours until dried. The resulting mass comprises the support material in which is incorporated a mixture of the aforementioned chlorides. These chlorides are partly coated on the outside surface of the support material and partly deposited within the pores thereof.

The following examples illustrate a method of preparing a typical novel catalyst.

EXAMPLE 1

A mixture of the following chlorides was dissolved in 240 ml. of water. This mixture consisted of 4.66, 3.92 and 5.83 grams copper chloride ($CuCl_2 \cdot 2H_2O$), potassium chloride and didymium chloride ($DiCl_3 \cdot 6H_2O$), respectively. The resulting solution was thoroughly blended with 446 grams (400 ml.) of alpha alumina support having a surface area of 0.67 m.$^2$/gm., pore volume of 0.18 ml./gm. and a bulk density of 1.12 gm./cc. Blending of the chlorides solution with alpha alumina was carried out in a porcelain dish. The resulting wet mass was then dried overnight in an oven which was maintained at 200° C. The resulting dried catalyst showed the following sieve analysis:

| U.S. standard sieve No. | Opening in microns | Weight percent retained as— |
|---|---|---|
| 30 | 590 | 0.0 |
| 60 | 250 | 6.0 |
| 100 | 149 | 9.8 |
| 200 | 74 | 43.4 |
| 230 | 62 | 8.2 |
| 270 | 53 | 6.2 |
| 325 | 44 | 12.2 |
| Pan | 0 | [1] 14.2 |

[1] Discarded.

The following examples illustrate the superior results obtained by using low surface area alpha alumina as a support material instead of high surface area alumina.

EXAMPLE 2

(A) A mixture of 30.4 grams copper chloride ($CuCl_2 \cdot 2H_2O$)

21.1 grams potassium chloride and 31.9 grams didymium chloride ($DiCl_3 \cdot 6H_2O$) was dissolved in 300 ml. of water. The resulting solution was poured on, and mixed thoroughly with 600 grams of alpha alumina having a surface area of 1.49 m.$^2$/gm., pore volume of 0.275 ml./gm., bulk density of 1.08 gm./ml. and a particle size of 100 x 325 mesh. The mixture was then dried in an oven at 200° C. for 16 hours.

(B) Approximately 425 cc. of the catalyst prepared in part A above was charged to an electrically-heated Pyrex glass reactor 6 feet long and 1.45 inches I.D. The reactor was provided with a ⅜ inch O.D. thermowell which extended from the top to about 1 inch from the bottom of the reactor, and with a bottom inlet for the feed. Methane, hydrogen chloride and air at the rates of 2.20 mols/hr., 2.20 mols/hr. and 1.40 mols/hr., respectively, were passed through the reactor which was maintained at 400–404° C. The reactor effluent was passed through a water scrubber, a calcium chloride tower and a series of cold traps cooled by a mixture of Dry Ice and acetone. Hydrogen chloride was removed in the scrubber and the water from the scrubber was analyzed at 30 minute intervals to determine its HCl content. The composition of the materials condensed in the cold traps as well as the carbon oxides content of the vent gas (leaving the cold traps) were determined by gas chromatography.

The experimental results are shown in Table I below.

EXAMPLE 3

(A) A mixture of 30.4 grams copper chloride ($CuCl_2 \cdot 2H_2O$)

21.1 grams potassium chloride and 31.9 grams didymium chloride ($DiCl_3 \cdot 6H_2O$) was dissolved in 300 ml. of water. Approximately 750 grams of alumina hydrate was heated for 3 hours at 400° C. The heat-treated alumina had a surface area of 155 m.$^2$/gm., pore volume of 0.337 ml./gm., bulk density of 0.87 gm./gm. and particle size of 100 x 325 mesh.

The above solution of the chlorides was mixed thoroughly with 600 grams of alumina and the mixture was dried in an oven at 200° C. for 16 hours.

(B) Approximately 425 cc. of the catalyst described in step A of this example was charged to the reactor described in Example 2 and the experiment was carried out in essentially the same manner as that described in part B of Example 2. The experimental results are shown in Table I for comparison with the results obtained in Example 2.

TABLE I

| Example | 2 | 3 |
|---|---|---|
| Feed rates, mols/hr.: | | |
| Methane | 2.20 | 2.20 |
| HCl | 2.20 | 2.20 |
| Air | 1.40 | 1.40 |
| Reactor temperature, ° C | 400–404 | 400–410 |
| Duration of experiment, hr | 2.5 | 2.5 |
| Products in cold traps, gm./hr.: | | |
| $CH_3Cl$ | 13.12 | 18.20 |
| $CH_2Cl_2$ | 12.44 | 28.18 |
| $CHCl_3$ | 6.56 | 22.20 |
| $CCl_4$ | 1.93 | 6.42 |
| Losses to carbon oxides, mol percent | 11.1 | 2.9 |
| HCl conversion, mol percent | 43.1 | 6.8 |
| Surface area of support, m.$^2$/gm | 155 | 1.49 |

It is clear from Table I that the use of low surface area support materials is decidedly more advantageous than the use of high surface area support materials. This is clearly demonstrated by increased conversion of HCl and decrease in losses to carbon oxides (carbon monoxide and carbon dioxide).

EXAMPLES 4–5

In these examples the catalysts which were employed were respectively those prepared in part A, Example 2 and part A, Example 3. In each case 425 cc. of the catalyst was charged to the reactor and the experiments were carried out in essentially the same manner as that described in part B of Example 2, the difference being that in Examples 4 and 5 ethane was the hydrocarbon feed. The results of these examples are shown in Table II below.

TABLE II

|  | 4 | 5 |
|---|---|---|
| Feed rates, mols/hr.: | | |
| Ethane | 2.20 | 2.20 |
| HCl | 2.20 | 2.20 |
| Air | 1.40 | 1.40 |
| Reactor temperature, °C | 400–402 | 400–404 |
| Duration of experiment, hr | 2.5 | 2.5 |
| Products in cold traps, gm./hr.: | | |
| $C_2H_6$ | 2.52 | 2.13 |
| $CH_2CHCl$ | 2.19 | 5.25 |
| $CH_3CH_2Cl$ | 20.08 | 62.40 |
| $CH_3CHCl_2$ | 0.59 | 6.16 |
| $CH_2Cl-CH_2Cl$ | 9.52 | 14.37 |
| Other chlorinated by-products | 8.60 | 12.69 |
| Losses to carbon oxides, mol percent | 11.1 | 1.4 |
| HCl conversion, mol percent | 46.8 | 94.5 |
| Surface area of support, $m.^2/gm$ | 155 | 1.49 |

In these examples the surface area of alumina was determined by nitrogen absorption method using a Perkin-Elmer-Shell sorptometer and the pore volume was determined by titration procedure (Analytical Chemistry, vol. 34, p. 714), using methyl Cellosolve as the titrant.

As indicated previously, the catalyst of this invention is particularly well suited for the oxidative chlorination of hydrocarbons to produce the corresponding chlorinated hydrocarbons. The hydrocarbon reactants which are suitable starting materials for the process of this invention are aliphatic hydrocarbons of up to 4 carbon atoms in which adjacent carbon atoms are linked by 1 to 2 valence bonds. Such hydrocarbons include methane, ethane, propane, butane, isobutane, ethylene, propylene, butylene, isobutylene, etc., or mixtures thereof. Similarly, the partially chlorinated hydrocarbons of the aforementioned hydrocarbons are also suitable starting materials for the process of this invention. The partially chlorinated hydrocarbons are those chlorinated aliphatic hydrocarbons which contain up to 4 carbon atoms and in which adjacent carbon atoms are linked by 1 to 2 valence bonds. Examples of such partially chlorinated hydrocarbons include methyl chloride, methylene chloride, chloroform, ethyl chloride, ethylene dichloride, propyl chloride, propylene chloride, butyl chloride, butylene chlorides, etc., or mixtures thereof. Also, the starting material may include a mixture of both said chlorinated and unchlorinated hydrocarbons. Thus, the feed mixture can include methane, methyl chloride and methylene chloride; or it can include ethane, ethyl chloride, ethylene, ethylene dichloride, etc. Such mixtures are usually present in the reaction zone by recycling some or all of the partially chlorinated hydrocarbons to the reaction zone. Some or all of the unreacted hydrocarbon starting materials can be recycled to the reaction zone to effect further chlorination thereof.

Hydrogen chloride and/or chlorine can both be employed as the chlorinating agents in the process of this invention. However, anhydrous gaseous hydrogen chloride is a particularly advantageous source of chlorine for these reactions.

Air and/or any oxygen-containing gas can be advantageously employed for the oxychlorination reactions of this invention. The use of oxygen-containing gas which is preferably at least 95% by weight oxygen is more advantageous than using air from the operational standpoint. One difficulty with using air as the source of oxygen is the presence of large amounts of nitrogen which must be vented from the system. Additionally, the presence of nitrogen complicates the separation of some of the lower boiling unreacted hydrocarbon materials such as, for example, methane, from the vent gas. When using an oxygen-containing gas other than air, it is understood, of course, that the component or components of the gas, exclusive of oxygen, must be essentially inert under the reaction conditions prevailing in the system. Such oxygen-containing gases include mixtures of oxygen and $CO_2$ and mixtures of oxygen and water, etc.

The ratio of the reactants which can be employed in the process of this invention can be varied over a relatively wide range depending upon the hydrocarbon starting material, the desired chlorinated product, the degree of chlorination and on other reaction conditions. Although stoichiometric amounts of hydrogen chloride and oxygen can be satisfactorily employed, it is preferable to employ a slight excess of oxygen, say, from about 5 to about 10 percent oxygen in excess of the stoichiometric requirement.

Depending upon the desired end product, some or all of the partially chlorinated or unchlorinated (unreacted) hydrocarbon can be recycled to the reaction zone. For example, partially chlorinated derivatives of ethane can be recycled to produce ethylene or partially chlorinated derivative of ethylene. In such instances, of course, some dehydrochlorination occurs in the reaction zone, and it is therefore desirable to employ additional amounts of oxygen to consume the hydrogen chloride which is thus produced.

The ratio of hydrogen chloride (or chlorine) to the hydrocarbon starting material can also vary over a relatively wide range depending, inter alia, on the desired end products. Low ratios of hydrogen chloride to hydrocarbon seem to favor the formation, in high yields, of the less chlorinated products such as, for example, methyl chloride from methane; ethyl chloride from ethane, etc., whereas high ratios favor the formation of the more highly chlorinated hydrocarbons, such as, for example, chloroform and carbon tetrachloride from methane; tetrachloroethane from ethane, etc.

The reaction temperature can be varied over a relatively wide range depending also upon the hydrocarbon reactant, the desired end products, etc. Thus, the temperature can vary from about 275° C. to about 600° C. For example, when methane and/or partially chlorinated methane are reacted by the process of this invention, the temperature is desirably from about 375° C. to about 425° C.

The pressure in the reaction zone can be either atmospheric or superatmospheric. Pressures ranging from about 50 to about 200 p.s.i.g. are preferred since high productivities and more efficient recovery of low-boiling products are possible at these superatmospheric pressures.

In one embodiment of this invention it is preferable to operate the reaction zone under substantially adiabatic conditions. The oxidative chlorination of hydrocarbons is a high exothermic reaction. Heretofore, it has been a common practice to remove the heat of reaction from the reaction zone by providing internal cooling coils in the reaction zone or an external jacket through which a heat transfer liquid such as Dowtherm is employed. The use of internal cooling coils is impractical in view of the use of corrosive materials such as hydrogen chloride, chlorine and chlorinated hydrocarbons in the reaction zone. The use of Dowtherm is also impractical from the standpoint of the operating temperature since the preferable operating temperature in the reaction zone is above 350° C. at which temperature Dowtherm is unsatisfactory. It has therefore been discovered that the reaction zone may be maintained at substantially adiabatic conditions by recycling the carbon oxides, unreacted hydrocarbons and intermediate chlorinated hydrocarbons to the reaction zone. The rate of recycle is so adjusted that the heat of reaction is balanced by the heat required to raise the temperature of the feed to the reaction zone (including recycle) to the desired operating temperature.

Recycling the carbon oxides, unreacted hydrocarbons and the intermediate chlorinated hydrocarbons to the reation zone does not materially affect the course of the reaction, while at the same time offers the advantages of maintaining the reaction zone at adiabatic condition without the necessity of internal or external cooling to remove the heat of reaction. The adiabatic operation of the process of this invention is illustrated by Example 7.

Although the process of this invention may be carried out in a fixed-bed reactor it is preferably to resort to fluid-bed operation. In carrying out the novel process, the reactants, in the vapor state, are introduced into the reaction zone at a point in the lower section thereof, preferably at the bottom. The catalyst particles in the reaction zone are thus maintained in fluidized state by the vaporous feed material which ascend through said zone. The determination of the optimum fluidization velocity and other suitable conditions of fluidization are not narrowly critical in this invention as they are within the knowledge of a skilled operator.

The process of this invention is effected under the aforementioned conditions and the effluent from the reaction zone is subjected to product recovery section to separate the desired chlorinated products. Unreacted hydrocarbons and/or partially chlorinated hydrocarbons can be recycled to the reaction zone.

Since hydrogen chloride, chlorine and corrosive chlorinated products are present in the reaction zone or the auxiliary equipment, it is obviously preferable to employ corrosion-resistant materials of construction for the equipment employed in this process. Such corrosion-resistant materials are well known in the art and include stainless steel, Inconel, refractory or refractory-lined materials, etc.

The following examples will illustrate the method of this invention using the novel catalyst.

EXAMPLE 6

Three hundred and seventy-three grams of the catalyst prepared in Example 1 was charged to an elongated, electrically-heated Pyrex glass reactor 90 inches long and 1¼ inch I.D. The catalyst was supported on a sintered pyrex plate located at the bottom of the reactor. The reactor was also equipped with a Pyrex thermowell extending therethrough and terminating at about one inch from the bottom thereof, a gas inlet at the bottom, and a disengaging section 12 inches long and 3 inches I.D. which was connected to the top of the reactor. This disengaging section served to prevent or minimize the loss of catalyst from the reactor.

The reactor was heated and the catalyst temperature was raised to 360° C. by an ascending stream of air. When the temperature reached 360° C. the flow of air was interrupted and gaseous methylene chloride, gaseous hydrogen chloride and air were introduced to the reactor through the bottom inlet at the rates of 1.35 gram mols/hr., 1.35 gram mols/hr. and 82 liters/hr., respectively. The reactor effluent was successively passed through a water scrubber, a calcium chloride tower and a cold trap cooled by Dry Ice and acetone.

Hydrogen chloride was essentially removed in the water scrubber and the water therefrom was analyzed at 30 minute intervals to determine the HCl content thereof. The vent gas from the cold trap was bubbled through a toluene trap maintained at −78° C. to remove traces of chlorinated hydrocarbons and elemental chlorine, if any. The vent gas was analyzed for $CO_2$ by Orsat analysis and for CO by gas chromatography. The composition of the condensate in the cold trap was determined by gas chromatographic analysis.

The experimental run was carried out over a six-hour period during which the temperature of the catalyst was raised from 360° C. to 380° C. and finally to 400° C. at 2 hour intervals. The catalyst particles in the reactor were maintained in a fluidized state throughout this experiment and the pressure in the reactor was maintained at 0 to 3 p.s.i.g. during this period.

689 grams of condensate was recovered from the cold trap. The composition of this condensate was 43% methylene chloride, 39% chloroform and 18% carbon tetrachloride, all percentages being by weight.

Hydrogen chloride conversions were 52%, 66%, and 86% at the aforementioned temperatures of 360° C., 380° C., and 400° C., respectively. The losses of methylene chloride to carbon oxides were less than 1%.

EXAMPLE 7

The equipment employed in this example included an electrically-heated elongated Inconel reactor 68½ inches long and 1½ inches I.D. The temperature of the reactor was measured by means of thermocouples located in a thermowell which extended from the top of the reactor to about 2 inches from the bottom of the reactor.

Approximately 1460 grams of catalyst (1300 cc.) was charged to the reactor. The catalyst consisted of a mixture of copper chloride, sodium chloride and didymium chloride supported on alumina. The composition of the catalyst was:

| Composition— | Weight percent |
|---|---|
| Alumina | 97.5 |
| Copper chloride | 1.0 |
| Sodium chloride | 1.0 |
| Didymium chloride | .5 |

Two runs were made wherein a feed mixture of methane, methyl chloride, methylene chloride, chloroform, nitrogen, oxygen, and hydrogen chloride were introduced into the reactor at a superficial velocity of .38 ft./sec. The reaction was carried out under fluidized conditions and the reactor effluent in each case was passed through a water scrubber to remove unreacted hydrogen chloride. The scrubbed gas was then passed through a calcium chloride tower to dry the gas and the dried gas was thereafter passed through a series of cold traps (Dry Ice and acetone) to remove the chloromethanes. The material in the cold trap, as well as the stripped gas were analyzed by vapor phase chromatography and water from the scrubber was analyzed by titration with caustic solution to determine its hydrogen chloride content. The results of these two runs are given in Table III below.

TABLE III

| | Run 1 | Run 2 |
|---|---|---|
| Feed, mole percent: | | |
| $CH_4$ | 17.3 | 7.6 |
| $CH_3Cl$ | 7.8 | 3.5 |
| $CH_2Cl_2$ | 11.8 | 5.3 |
| $CHCl_3$ | 19.6 | 8.8 |
| HCl | 20.9 | 8.4 |
| $O_2$ | 13.2 | 5.6 |
| $N_2$ | 9.5 | 60.7 |
| Temperature, ° C | 401 | 401 |
| Total pressure, p.s.i.g | 25 | 80 |
| Superficial velocity, ft./sec | .38 | .37 |
| HCl converted, mol percent | 84.6 | 85.4 |
| Conversion of methane+chloromethanes to $CO+CO_2$, mol percent | 2.5 | 2.5 |

In run 2 in Table 3, when part of the chloroform and methylene chloride is introduced to the reactor as a liquid and the remaining feed as a vapor at about 100° C., the heat required to vaporize and raise the feed to reaction temperature equals the heat of reaction, i.e., the reactor can be operated adiabatically. It is noted in Table III that the presence of diluent to remove the heat of reaction does not in any way affect the process in an adverse manner. This is evidenced by the high hydrogen chloride conversion and the low carbon oxide formations in both runs.

What is claimed is:
1. A novel catalyst composition consisting essentially of from about 1 to about 10 wt. percent copper chloride, from about 1 to about 10 wt. percent of chloride of a metal selected from the group consisting of the alkali metals and from about 1 to about 10 wt. percent of chloride of a metal selected from the group consisting of the rare earth metals, said percentages being based on and said chlorides being supported by an inert carrier material having a low surface area no greater than about 10 square meters per gram.
2. The composition of claim 1 wherein said inert carrier has a surface area no greater than about 10 square meters per gram and a pore volume ranging from about 0.15 to about 0.3 milliliter per gram.

3. The composition of claim 1 wherein said inert carrier is alpha alumina.

4. A composition of claim 2 wherein said inert carrier is alpha alumina.

5. A novel catalyst composition consisting essentially of from about 1 to about 10 wt. percent copper chloride, from about 1 to about 10 wt. percent potassium chloride and from about 1 to about 10 wt. percent didymium chloride, said percentages being based on and said chlorides being supported by alpha alumina having a low surface area no greater than about 10 square meters per gram.

6. A composition of claim 5 wherein said alpha alumina has a pore volume ranging from about 0.15 to about 0.3 milliliter per gram.

7. A composition of claim 5 wherein the surface area of said alpha alumina ranges from about .5 to about 3.0 square meters per gram.

8. A composition of claim 7 wherein the pore volume of said alpha alumina ranges from about 0.15 to about 0.3 cubic centimeter per gram.

9. In a process of oxidative chlorination of hydrocarbons to produce chlorinated hydrocarbons therefrom, which process comprises contacting a vaporous mixture of aliphatic hydrocarbon, a chlorinating agent and oxygen-containing gas with a catalyst disposed in a reaction zone, said aliphatic hydrocarbon containing up to 4 carbon atoms, wherein adjacent carbon atoms are linked by 1 to 2 valence bonds, said catalyst consisting essentially of a mixture of from about 1 to about 10 wt. percent copper chloride, from about 1 to about 10 wt. percent of chloride of a metal selected from the group consisting of alkali metals and from about 1 to about 10 wt. percent of chloride of a metal selected from the group consisting of rare earth metals, said percentages being based on and said chloride being supported by an inert carrier material having a low surface area no greater than about 10 square meters per gram, maintaining said reaction zone at a temperature ranging from about 275° C. to about 600° C. and under a pressure ranging from about 0 p.s.i.g. to about 200 p.s.i.g. and recovering the chlorinated hydrocarbons from the effluent of the reaction zone.

10. The process of claim 9 wherein unreacted hydrocarbon and from part of all of the partially chlorinated products thereof are recycled to the reaction zone.

11. The process of claim 9 wherein the reaction zone is maintained under fluidized conditions.

12. The process of claim 10 wherein the reaction zone is maintained under fluidized conditions.

13. The process of claim 9 wherein the reaction zone is operated substantially adiabatically by cooling the effluent from the reaction zone and recycling said cooled effluent to said reaction zone.

14. The process of claim 11 wherein the reaction zone is operated substantially adiabatically by cooling the effluent from the reaction zone and recycling said cooled effluent to said reaction zone.

15. In the process of oxidative chlorination of ethane which comprises contacting a vaporous mixture of ethane, hydrogen chloride and oxygen-containing gas with a catalyst disposed in a reaction zone, said catalyst consisting essentially of a mixture of from about 1 to about 10 wt. percent copper chloride, from about 1 to about 10 wt. percent potassium chloride and from about 1 to about 10 wt. percent didymium chloride, said percentages being based on and said chlorides being supported by alpha alumina having a surface area no greater than 10 square meters per gram and a pore volume ranging from about 0.15 to about 0.3 milliliter per gram, maintaining said reaction zone at a temperature ranging from about 300° C. to about 600° C. and a pressure from about 0 p.s.i.g. to 200 p.s.i.g., under fluidized conditions, and recovering chlorinated ethane and chlorinated ethylene from the effluent of the reaction zone.

References Cited

UNITED STATES PATENTS

| 2,399,488 | 4/1946 | Hearne. | |
| 3,210,431 | 10/1965 | Engel. | |
| 3,267,161 | 8/1966 | Ukaji et al. | |
| 2,752,402 | 6/1956 | Pye | 260—659 |
| 3,184,515 | 5/1965 | Penner et al. | 260—659 |
| 3,240,827 | 5/1966 | Laine et al. | 260—659 |

FOREIGN PATENTS

| 1,321,708 | 2/1963 | France. |
| 1,352,448 | 6/1964 | France. |

LEON ZITVER, *Primary Examiner.*

T. G. DILLAHUNTY, *Assistant Examiner.*

U.S. Cl. X.R.

252—441, 442; 260—656, 658